(12) United States Patent
Park et al.

(10) Patent No.: US 10,347,218 B2
(45) Date of Patent: Jul. 9, 2019

(54) MULTIPLE ORIENTATION DETECTION

(71) Applicant: QUALCOMM Incorporated, San Diego, CA (US)

(72) Inventors: Edwin Chongwoo Park, San Diego, CA (US); Raghuraman Krishnamoorthi, San Diego, CA (US); Venkat Rangan, San Diego, CA (US); Nelson Rasquinha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/647,034

(22) Filed: Jul. 11, 2017

(65) Prior Publication Data

US 2018/0018946 A1 Jan. 18, 2018

Related U.S. Application Data

(60) Provisional application No. 62/361,405, filed on Jul. 12, 2016.

(51) Int. Cl.
*G06T 7/73* (2017.01)
*G09G 5/38* (2006.01)
(Continued)

(52) U.S. Cl.
CPC .............. *G09G 5/38* (2013.01); *G06F 3/0346* (2013.01); *G06K 9/00228* (2013.01);
(Continued)

(58) Field of Classification Search
CPC ...... G06K 9/00221–00295; G06T 7/70; G06T 7/73
See application file for complete search history.

(56) References Cited

U.S. PATENT DOCUMENTS 9,558,714 B2 1/2017 Pasquero et al.
2005/0013479 A1* 1/2005 Xiao ................ G06K 9/00228
382/159
(Continued)

FOREIGN PATENT DOCUMENTS

| DE | 102008052930 A1 | 4/2010 |
|---|---|---|
| WO | 2008116503 A1 | 10/2008 |
| WO | 2013168173 A1 | 11/2013 |

OTHER PUBLICATIONS

International Search Report and Written Opinion—PCT/US2017/041659—ISA/EPO—dated Oct. 10, 2017.
(Continued)

*Primary Examiner* — Ryan McCulley
(74) *Attorney, Agent, or Firm* — Kilpatrick Townsend & Stockton, LLP

(57) ABSTRACT

Methods, systems, computer-readable media, and apparatuses for image processing and utilization are presented. In some embodiments, an image containing at a face of a user may be obtained using a mobile device. An orientation of the face of the user within the image may be determined using the mobile device. The orientation of the face of the user may be determined using multiple stages: (a) a rotation stage for controlling a rotation applied to a portion of the image, to generate a portion of rotated image, and (b) an orientation stage for controlling an orientation applied to orientation-specific feature detection performed on the portion of rotated image. The determined orientation of the face of the user may be utilized as a control input to modify a display rotation of the mobile device.

26 Claims, 12 Drawing Sheets

(51) Int. Cl.
*G06F 3/0346* (2013.01)
*G06K 9/00* (2006.01)
*G06T 3/60* (2006.01)

(52) U.S. Cl.
CPC ............... *G06T 3/606* (2013.01); *G06T 7/74* (2017.01); *G06T 2207/30201* (2013.01); *G09G 2340/0492* (2013.01); *G09G 2354/00* (2013.01); *G09G 2360/08* (2013.01); *G09G 2360/12* (2013.01)

(56) References Cited

U.S. PATENT DOCUMENTS

| | | | | |
|---|---|---|---|---|
| 2005/0104848 | A1* | 5/2005 | Yamaguchi | G06F 1/1626 345/156 |
| 2005/0105805 | A1* | 5/2005 | Nicponski | G06K 9/00248 382/216 |
| 2005/0234324 | A1* | 10/2005 | Sugimoto | G06K 9/00228 600/407 |
| 2007/0292019 | A1* | 12/2007 | Terakawa | G06K 9/00248 382/159 |
| 2008/0239131 | A1* | 10/2008 | Thorn | G06K 9/00248 348/333.01 |
| 2008/0253664 | A1* | 10/2008 | Li | G06K 9/00228 382/226 |
| 2010/0066763 | A1* | 3/2010 | MacDougall | G06F 1/1626 345/656 |
| 2010/0287053 | A1* | 11/2010 | Ganong | G06F 17/30247 705/14.66 |
| 2011/0199499 | A1* | 8/2011 | Tomita | G06K 9/00268 348/222.1 |
| 2012/0081392 | A1 | 4/2012 | Arthur | |
| 2012/0294533 | A1* | 11/2012 | Ikenoue | H04N 1/3877 382/195 |
| 2013/0182139 | A1 | 7/2013 | Brunner | |
| 2013/0286049 | A1 | 10/2013 | Yang et al. | |
| 2014/0241635 | A1* | 8/2014 | Ruppaner | G06K 9/00228 382/197 |
| 2015/0030259 | A1* | 1/2015 | Kwon | G06T 3/606 382/296 |
| 2015/0128075 | A1* | 5/2015 | Kempinski | G06F 3/012 715/765 |
| 2015/0309564 | A1 | 10/2015 | Van | |
| 2017/0061639 | A1* | 3/2017 | Georgescu | G06K 9/00228 |
| 2017/0064211 | A1 | 3/2017 | Omid-Zohoor | |

OTHER PUBLICATIONS

Cheng L-P., et al., "iRotate: Automatic Screen Rotation Based on Face Orientation", SIGCHI Conference on Human Factors in Computing Systems, Austin, TX, USA, May 5-10, 2012, pp. 2203-2210.
Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.

* cited by examiner

| Feature Angle (in degrees) | Image Rotation (in degrees) | CV Unit Input Orientation (in degrees) | Feature Angle (in degrees) | Image Rotation (in degrees) | CV Unit Input Orientation (in degrees) | Feature Angle (in degrees) | Image Rotation (in degrees) | CV Unit Input Orientation (in degrees) | Feature Angle (in degrees) | Image Rotation (in degrees) | CV Unit Input Orientation (in degrees) |
|---|---|---|---|---|---|---|---|---|---|---|---|
| 0 | 0 | 0 | 90 | 0 | 90 | 180 | 0 | 180 | 270 | 0 | 270 |
| 15 | 15 | 0 | 105 | 15 | 90 | 195 | 15 | 180 | 285 | 15 | 270 |
| 30 | 30 | 0 | 120 | 30 | 90 | 210 | 30 | 180 | 300 | 30 | 270 |
| 45 | 45 | 0 | 135 | 45 | 90 | 225 | 45 | 180 | 315 | 45 | 270 |
| 60 | 60 | 0 | 150 | 60 | 90 | 240 | 60 | 180 | 330 | 60 | 270 |
| 75 | 75 | 0 | 165 | 75 | 90 | 255 | 75 | 180 | 345 | 75 | 270 |

Fig. 7

MULTIPLE ORIENTATION DETECTION

CROSS-REFERENCE TO RELATED APPLICATIONS

This application claims the benefit of U.S. Provisional Application No. 62/361,405, filed Jul. 12, 2016, entitled "MULTIPLE ORIENTATION DETECTION" which is incorporated herein by reference.

BACKGROUND

Aspects of the disclosure relate to the detection and utilization of object orientation associated with images captured by mobile devices. According to embodiments of the present disclosure, the detected orientation can be utilized in various ways. One example is the automatic control of the rotation of a display presented to a user by a mobile device. Assessing appropriate display rotation can be a challenging task. Current techniques are lacking in many ways in terms of both accuracy and computational efficiency. For instance, a simple auto display rotation feature commonly implemented in mobile devices utilizes the direction of gravity, as measured using an accelerometer, to control the rotation of the display presented to the user (e.g., "portrait" v. "landscape" rotation). However, proper display rotation sometimes cannot be accurately determined by simply using the direction of gravity. For example, if the mobile device is laid flat on a table with the display facing up toward the sky, the gravity vector is pointed in a direction perpendicular to the plane of the display and therefore provides no useful indication of the proper rotation of the display to present to the user. Oftentimes, the last orientation of the display before the device is laid down flat is kept in used, which may not be the appropriate rotation for proper viewing by the user. As another example, if the user holds a mobile device in front of his face while lying down on his side (e.g., on a bed), a gravity vector-controlled auto display rotation technique would generally result in incorrect display rotation from the perspective of the user. Here, the display may automatically rotate, incorrectly, with even small movements. This is because the system, using just the gravity vector, would only sense that the mobile device has moved from an upright position to a prone position and conclude that the display must be rotated (e.g., from "portrait" to "landscape" rotation) in response. However, the system would not sense that the user has also moved from an upright to a prone position, and therefore no rotation of the display would actually be needed. These and other shortcomings of existing systems highlight the need for improved techniques for image-related orientation detection and utilization.

BRIEF SUMMARY

Certain embodiments are described for improved display rotation based on image processing. A method may comprise obtaining, using a mobile device, an image containing a face of a user of the mobile device. The method may further comprising determining, using the mobile device, an orientation of the face of the user within the image. The orientation of the face of the user within the image may be determined using multiple stages, which may comprise: (a) a rotation stage for controlling a rotation applied to a portion of the image, to generate a portion of rotated image, and (b) an orientation stage for controlling an orientation applied to orientation-specific feature detection performed on the portion of rotated image. The method may further comprise utilizing the determined orientation of the face of the user as a control input to modify a display rotation of the mobile device.

In one embodiment, the portion of rotated image is stored in a rotation buffer. In one embodiment, the orientation-specific feature detection is performed using a computer vision (CV) computation unit. In one embodiment, the orientation of the face of the user within the image is determined based on multiple modes. The multiple modes may comprise: (a) a detection mode for detecting an initial orientation of the face of the user within an initial image and (b) a tracking mode for tracking the orientation of the face of the user within a subsequent image, using the detected initial orientation.

According to one embodiment, in the detection mode, the initial orientation of the face of the user within the image is detected by performing feature detection at a first plurality of hypothesized angles. In the same embodiment, in the tracking mode, the orientation of the face of the user within the subsequent image is tracked by performing feature detection at a second plurality of hypothesized angles, the second plurality being fewer than the first plurality.

According to another embodiment, in the tracking mode, the orientation of the face of the user within the subsequent image is tracked upon detection of a trigger condition associated with on a non-image sensor. For example, the non-image sensor may comprise an accelerometer.

BRIEF DESCRIPTION OF THE DRAWINGS

Aspects of the disclosure are illustrated by way of example. In the accompanying figures, like reference numbers indicate similar elements. The figures are briefly described below:

FIG. 7 is a table showing a wide range of hypothesized feature angles achieved via various combinations of (1) image rotation and (2) CV unit input orientation, according to various embodiments;

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Illustrative Use Cases

Figure 1A:
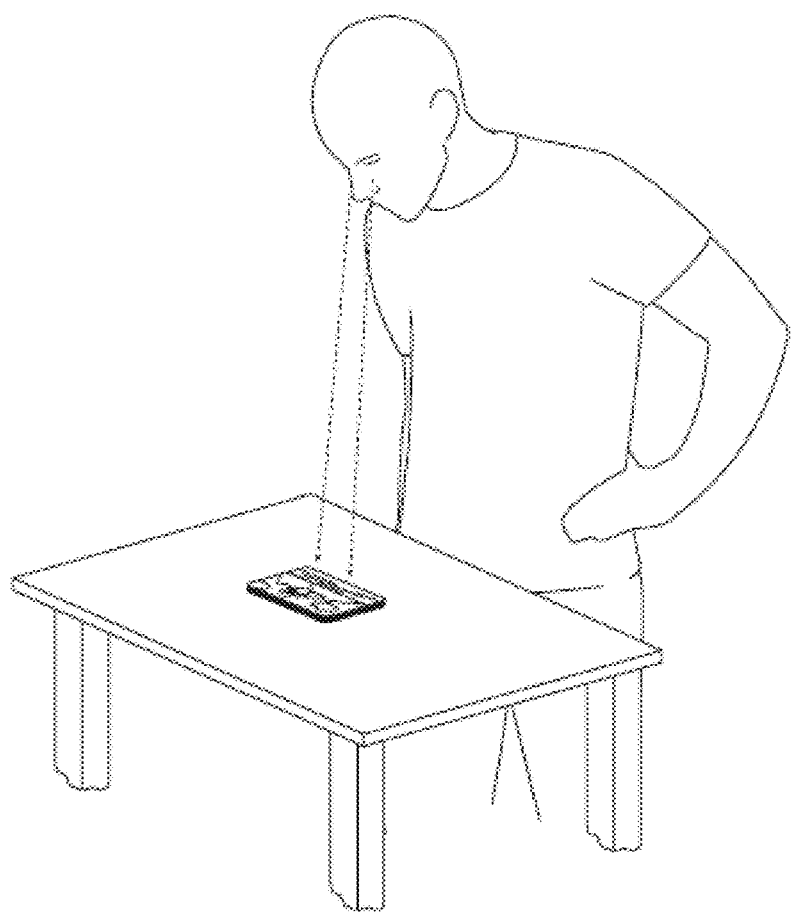
FIG. 1A depicts a scenario in which a mobile device is laid flat on top of a table and viewed by a user.

FIG. 1A depicts a scenario in which a mobile device is laid flat on top of a table and viewed by a user. Here, the user is looking at the display of the mobile device. The display is presenting an outdoor scene in "landscape" display rotation.

Figure 1B:
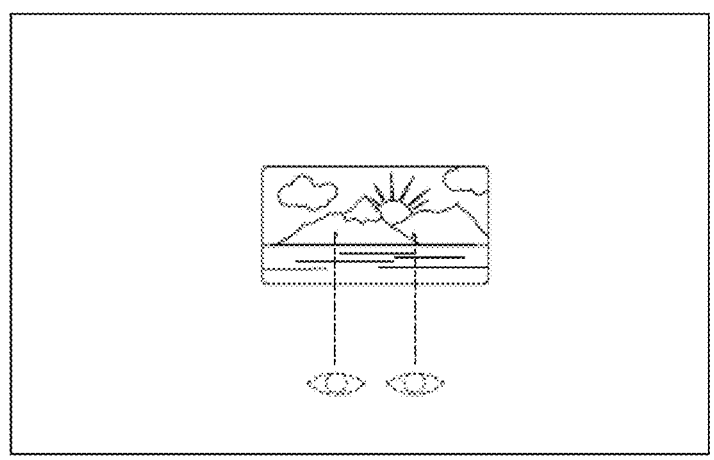
FIG. 1B is a different view of the scenario depicted in FIG. 1A, showing the orientation of the display of the mobile device and the position of the user.

FIG. 1B is a different view of the scenario depicted in FIG. 1A, showing the orientation of the display of the mobile device and the position of the user. As shown in the figure, the user is able to view the outdoor scene presented in "landscape" display rotation.

Figure 2A:
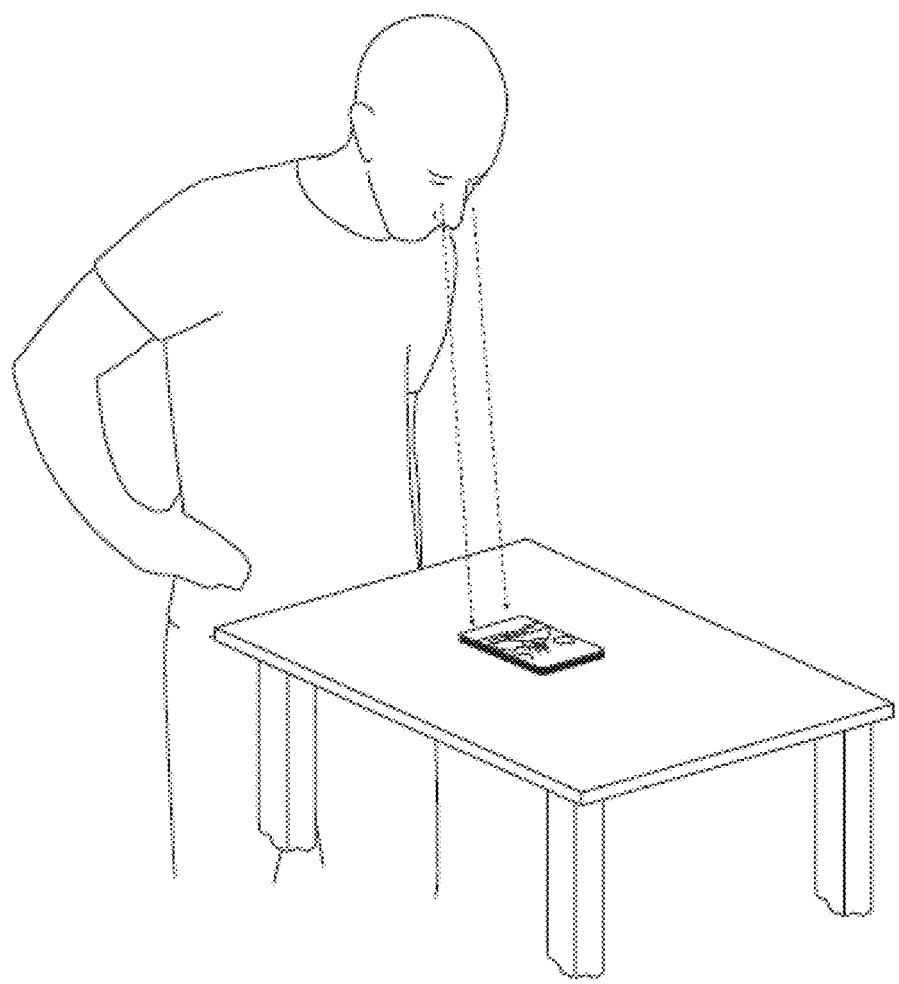
FIG. 2A depicts a subsequent scenario in which the mobile device remains in the same position on the table, but the user has moved to view the mobile device from a different user position, i.e., from a different side of the table.

FIG. 2A depicts a subsequent scenario in which the mobile device remains in the same position on the table, but the user has moved to view the mobile device from a different user position, i.e., from a different side of the table. In response to the new user position, the mobile device automatically adjusts the rotation of the display to show the outdoor scene in a "portrait-like" display rotation, according to embodiments of the present disclosure. Not only is the display rotation altered to be "portrait-like," the display rotation matches the new position of the user. That is, what the user sees is not an up-side-down "portrait" view, but a right-side-up "portrait" view of the outdoor scene. According to embodiments of the disclosure, the mobile device captures an image of the user with a front-facing camera (i.e., camera facing the user). The mobile device performs image processing to determine the orientation of the face of user within the captured image. The determined orientation of the user's face is then used to automatically adjust the rotation of the display, so that the proper display rotation is presented to the user. In this manner, the rotation of the display may "follow" the orientation of the user's face. Thus, in response to the user moving to the new user position (i.e., at a different side of the table), as depicted in FIG. 2A, the display is automatically rotated to match the user's new viewing position.

Figure 2B:
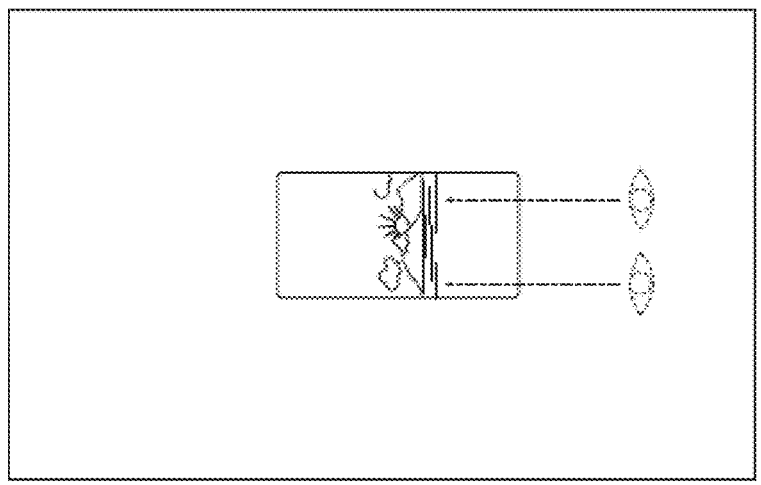
FIG. 2B is a different view of the scenario depicted in FIG. 2A, showing the orientation of the display of the mobile device, in response to the changed position of the user.

FIG. 2B is a different view of the scenario depicted in FIG. 2A, showing the orientation of the display of the mobile device, in response to the changed position of the user. As shown in the figure, the display is automatically rotated to present a right-side-up "portrait" view of the outdoor scene.

Figure 3A:
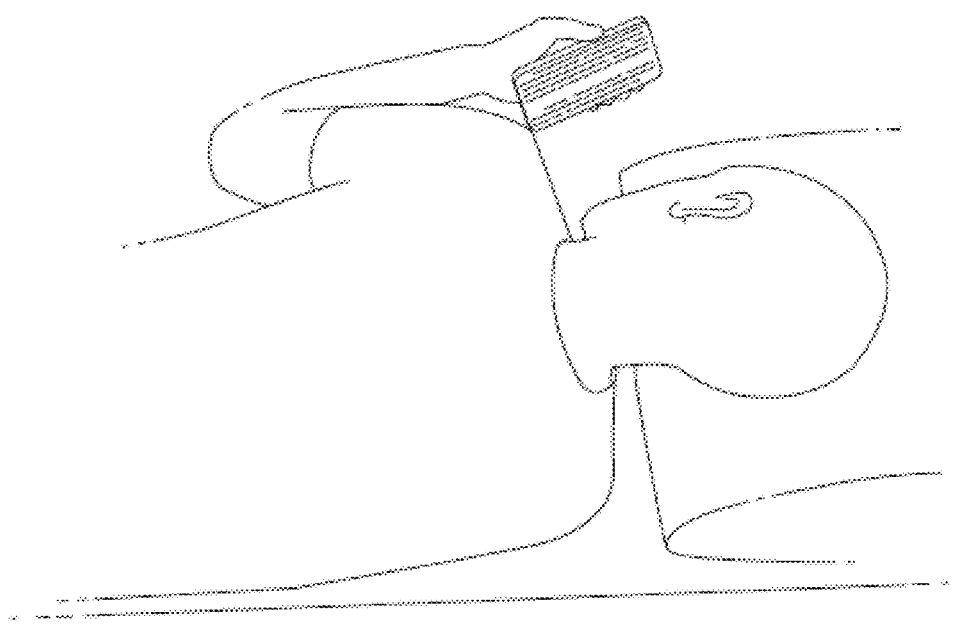
FIG. 3A depicts a potentially frustrating scenario in which a user views an incorrectly auto-rotated display on a mobile device held in his hand while lying down on his side (e.g., on a bed)

FIG. 3A depicts a potentially frustrating scenario in which a user views an incorrectly auto-rotated display on a mobile device held in his hand while lying down on his side (e.g., on a bed). Here, the mobile device utilizes a conventional technique for automatic display rotation, i.e., one based on the direction of gravity as sensed by an accelerometer. In the scenario depicted in FIG. 3A, reliance on the direction of gravity for automatic display rotation results in the incorrect rotation of the display from the perspective of the user. In this case, the mobile device, using just the gravity vector, only senses that the mobile device has moved from an upright position to a prone position and concludes that the display should be rotated (e.g., from "portrait" to "landscape" rotation) in response. However, the mobile device does not sense that the user has also moved from an upright to a prone position, and therefore no rotation of the display would actually be needed. Thus, the user is forced to read the text at an offset angle of 90 degrees.

Figure 3B:
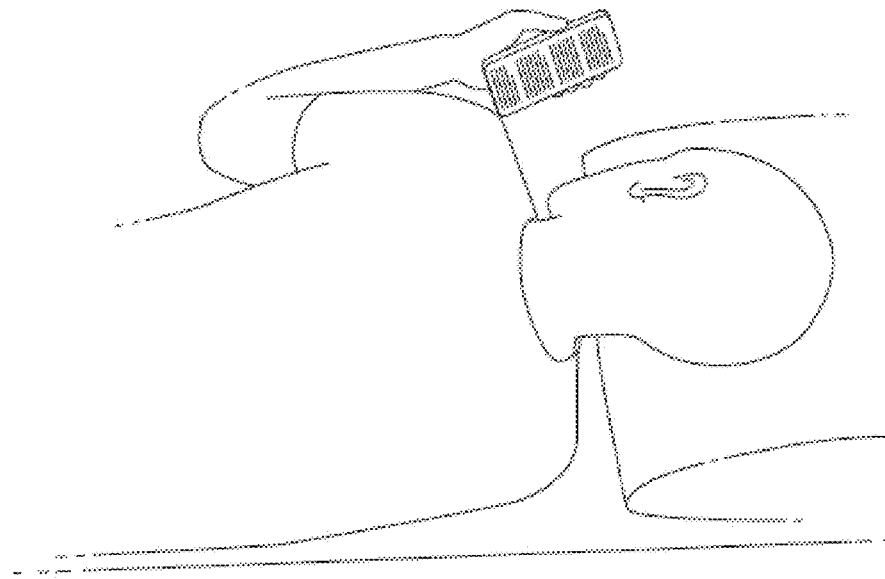
FIG. 3B depicts an improved scenario in which the user views a correctly auto-rotated display on a mobile device held in his hand while lying down on his side (e.g., on a bed)

FIG. 3B depicts an improved scenario in which the user views a correctly auto-rotated display on a mobile device held in his hand while lying down on his side (e.g., on a bed). According to various embodiments of the disclosure, the mobile device uses an image of the user captured from a front-facing camera and determines the orientation of the user's face. Based on the determined orientation of the user's face within the captured image, the mobile device automatically adjusts the rotation of the display. For example, this results in the text being presented on the display in the correct rotation for viewing by the user. The user is able to read the text without any appreciable offset angle.

Figure 3C:
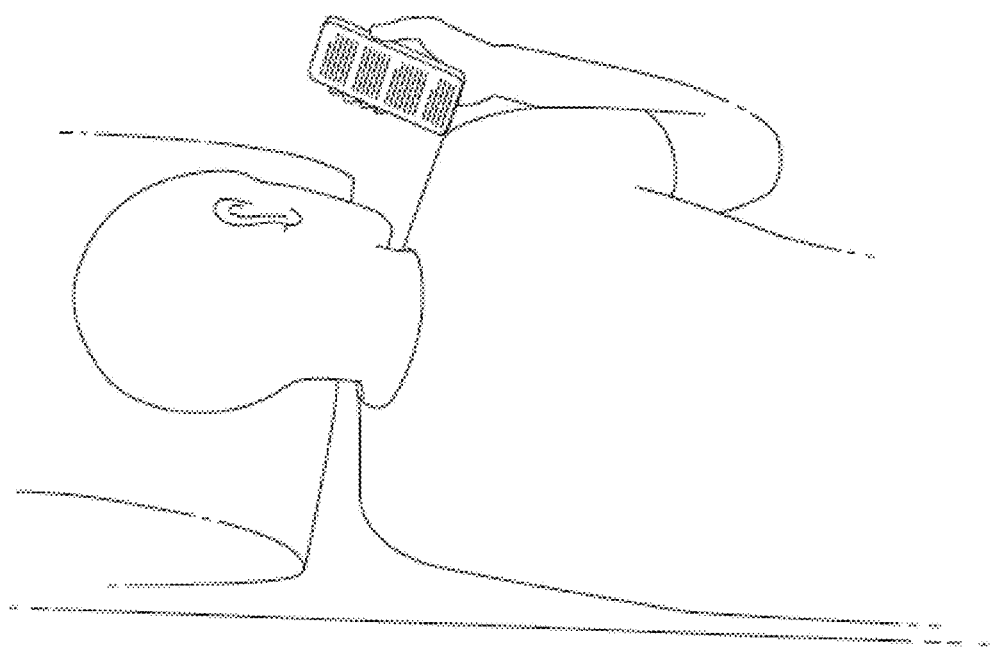
FIG. 3C depicts a similar scenario as FIG. 3B, with the user lying down on his other side.

FIG. 3C depicts a similar scenario as FIG. 3B, with the user lying down on his other side. Here again, the rotation of the display may "follow" the orientation of the user's face. Thus, even though the user has now changed his position to lie on the other side of his body, the text presented on the display is still in the correct rotation for viewing by the user. In yet another scenario (not shown), the user might be lying on his back while holding up the mobile device directly above his face, with the display of the device pointed in a downward direction toward the user's face. Here, if a conventional system based on direction of gravity is used to automatically control the rotation of the display, the display may be incorrectly and unintentionally rotated even with the slightest movement of the user's hand holding the mobile device. According to various embodiments of the present disclosure, the detected orientation of the user's face may be used, instead of the direction of gravity, to determine the appropriate rotation of the display and thus avoid such incorrect and unintentional display rotation.

Overall System

Figure 4:
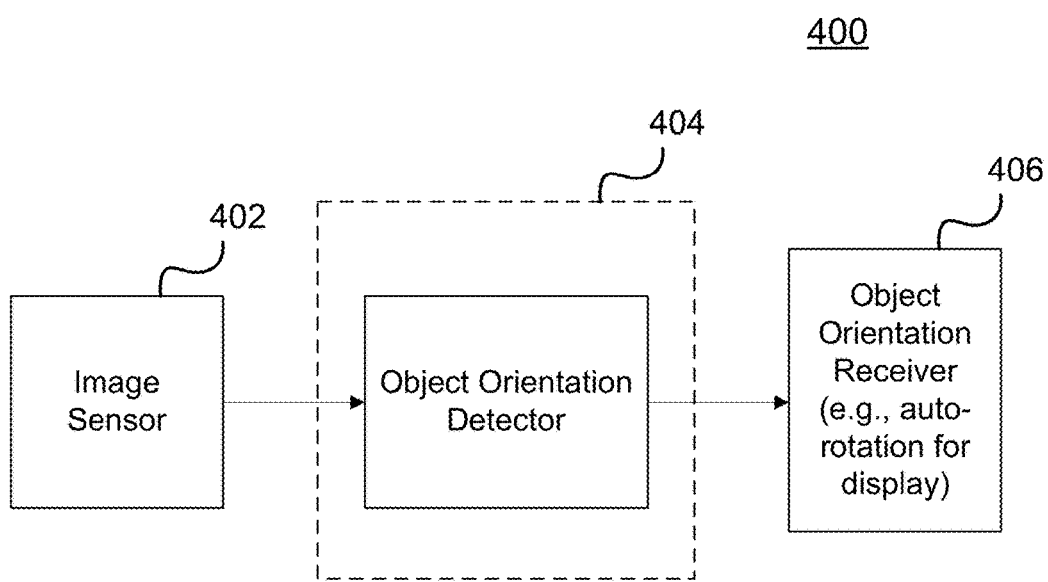
FIG. 4 is a high-level block diagram showing a system for detecting and utilizing the orientation of one or more objects in an image according to various embodiments of the disclosure.

FIG. 4 is a high-level block diagram showing a system 400 for detecting and utilizing the orientation of one or more objects in an image according to various embodiments of the disclosure. As shown, the system 400 comprises an image sensor 402, an object orientation detector 404, and an object orientation receiver 406. According to certain embodiments, system 400 resides on a mobile device, such as a handheld smart phone device. Image sensor 402 captures an image of a scene. The individual sensor elements, e.g., pixels, of image sensor 402 may be aligned in a rectangular grid in some embodiments but not aligned in a rectangular grid in other embodiments. The image is made available to object orientation detector 404. Object orientation detector 404 may have various components for efficiently determining the orientation of one or more objects within the image. One example of such an object is the face of a user of the mobile device. Thus, object orientation detector 404 may determine the rotational orientation (e.g., in degrees) of the face of the user within the image. Here, object orientation detector 404 may be trained to detect an object in different ranges of orientations. In some embodiments, the range of orientations covers an entire rotation of 360 degrees. In other embodiments, the object is only detected in a narrow range of orientations, e.g., plus or minus 30 degrees. The orientation of the one or more objects in the image is then provided to object orientation receiver 406. Object orientation receiver 406 represents a plethora of possible components that may utilize the determined orientation of the one or more objects within the image, to control one or more operations of the mobile device.

For example, the orientation of the user's face within the image, as determined by object orientation detector 404, may be used by object orientation receiver 406 to provide automatic display rotation for the mobile device. Here, the rotation of the display presented to the user may "follow" the orientation of the user's face. For instance, if the user tilts his head while viewing the display of the mobile device, while keeping the mobile device stationary, the display of the mobile device may rotate and follow the tilt of the user's face. Similarly, if the mobile device is laid flat on top of a table (e.g., as shown in FIGS. 1A and 2A), or if the mobile device is held by a user who is lying on his side (e.g., as shown in FIGS. 3B and 3C), the determined orientation of the user's face may be utilized in performing automatic display rotation of the mobile device.

In certain embodiments, automatic display rotation may be limited to only a few possible display rotation outcomes, such as rotations of 0 degrees, 90 degrees, 180 degrees, and 270 degrees. Such limited display rotation outcomes may be adopted, for example, for a display having a rectangular shape display. In other embodiments, automatic display rotation may result in a greater number of possible display rotation outcomes. For example, different display rotations separated by finer increments, e.g., 2 degrees, may be possible. Such a wider range of display rotation outcomes may be adopted, for example, for a display having a circular or other non-rectangular shape. Furthermore, the display rotation may be used in other ways. For example, the display may provide different information to the user depending on the rotation. As another example, a device such as a display filter, e.g., a polarized filter, may be changed depending on the display rotation. In one scenario, the direction of polarization of the display filter may be changed to match the direction of polarization of glasses worn by the user.

In a different example, the orientation of a Quick Response (QR) code within an image may be determined and utilized to implement a more efficient automatic QR code reader. Current QR code readers generally must be turned on manually to scan for a QR code. The alternative is to put the QR code reader in an always-on mode, which unnecessarily consumes computational resources and can quickly drain the battery charge in a mobile device. The computational demands of a QR reader are exacerbated by the lack of information regarding the orientation of the QR code captured in an image. In other words, if the orientation of the QR code in the image were known, the QR code reader can be given a "head start" and be able to read the QR code much more quickly and efficiently. According to various embodiments of the disclosure, object orientation detector 404 may determine the orientation of a QR code within an image captured by image sensor 402. The determined orientation of the QR code may then be provided to object orientation receiver 406. In this case, object orientation receiver 406 may control a QR code reader (not shown) implemented within the mobile device. Object orientation receiver 406 may automatically turn on the QR code reader and give the QR code reader a "head start" by providing the determined orientation of the QR code. This allows the QR code reader to read the QR code automatically and in a more efficient manner.

Two-Stage Object Orientation Determination

Figure 5:
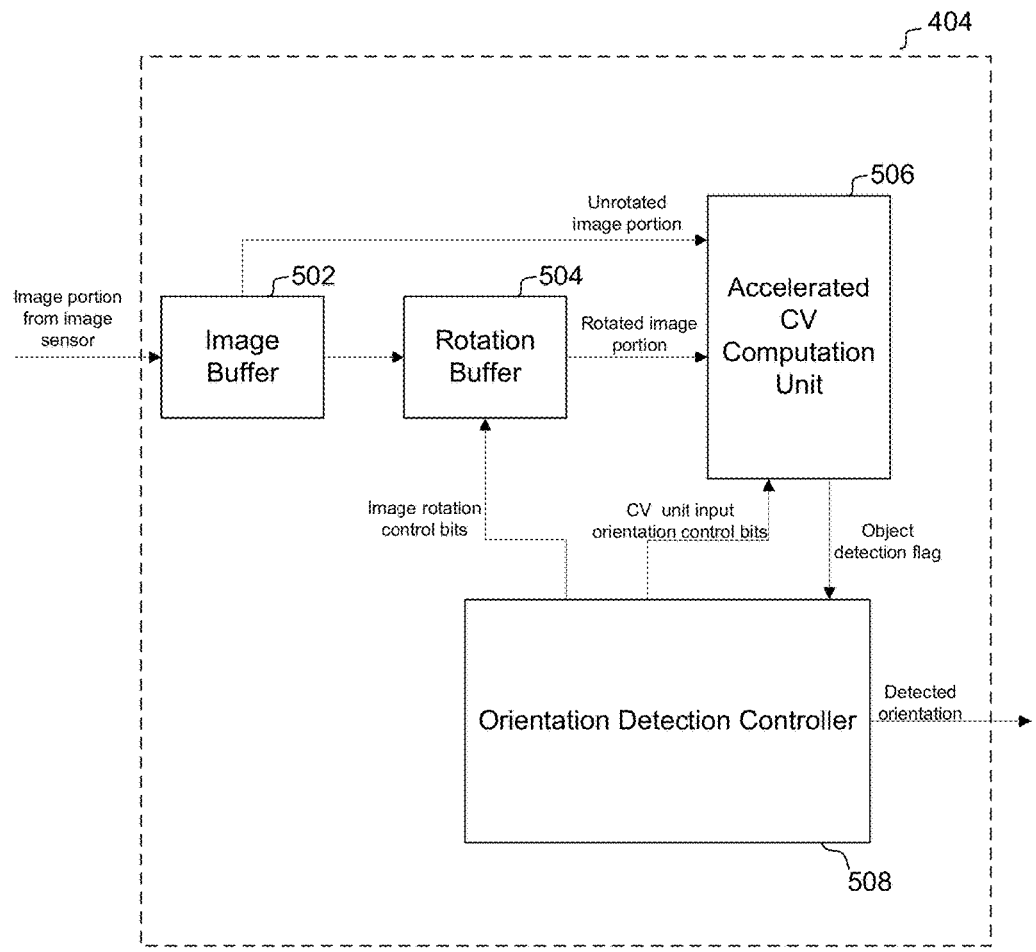
FIG. 5 is a more detailed block diagram showing exemplary components within an object orientation detector (such as the one shown in FIG. 4), in accordance with certain embodiments of the disclosure.

FIG. 5 is a more detailed block diagram showing exemplary components within an object orientation detector 404 (such as the one shown in FIG. 4), in accordance with certain embodiments of the disclosure. As shown, object orientation detector 404 comprises an image buffer 502, a rotation buffer 504, an accelerated computer vision (CV) computation unit 506, and an orientation detection controller 508. Here, a portion of an image captured by an image sensor is provided to and stored in image buffer 502. The portion of image may comprise an entire image as captured by the image sensor (e.g., image sensor 402 from FIG. 4) or a part of such an image. The portion of image may then be rotated according to a specified amount of rotation (e.g., degrees) and stored in rotation buffer 504. Here, the mechanism for performing the image rotation is not shown, but its operation may be understood by one of ordinary skill in the art. The amount of image rotation may be specified using control bits provided by orientation detection controller 508. Once the rotated image portion is obtained, it may be provided to accelerated CV computation unit 506.

In one embodiment, the unrotated image portion may also be provided directly from image buffer 502 to accelerated CV computation unit 506. In such an embodiment, during operations in which no image rotation is needed, rotation buffer 504 may be bypassed. In another embodiment, the unrotated image portion may be provided from rotation buffer 504 (controlled to provide zero rotation) to accelerated CV computation unit 506. In any event, the rotated and/or unrotated image portion is provided to accelerated CV computation unit 506.

According to various embodiments, accelerated CV computation unit 506 performs orientation-specific feature detection. In other words, accelerated CV computation unit 506 is capable of detecting a target feature at different specified orientations, as explained in more detail with respect to FIG. 6, discussed below. Orientation detection controller 508 may provide control bits to specify the orientation at which accelerated CV computation unit 506 is to perform feature detection. Upon detection of the target feature, accelerated CV computation unit raises an object detection flag, which is provided to orientation detection controller 508.

Thus, orientation detection controller 508 controls the operation of both rotation buffer 504 and accelerated CV computation unit 506 in a "multi-stage" approach, e.g., a "two-stage" approach, according to various embodiments of the disclosure. In one stage, the rotation of the portion of image stored in rotation buffer 504 is controlled. In another stage, the orientation input to the accelerated CV computation unit 506 is controlled. In the present embodiment, the control bits for both stages are provided simultaneously. Thus, the term "two-stage" broadly refers to the two types of control provided and is not meant to necessarily connote operation at two different times.

Figure 6:
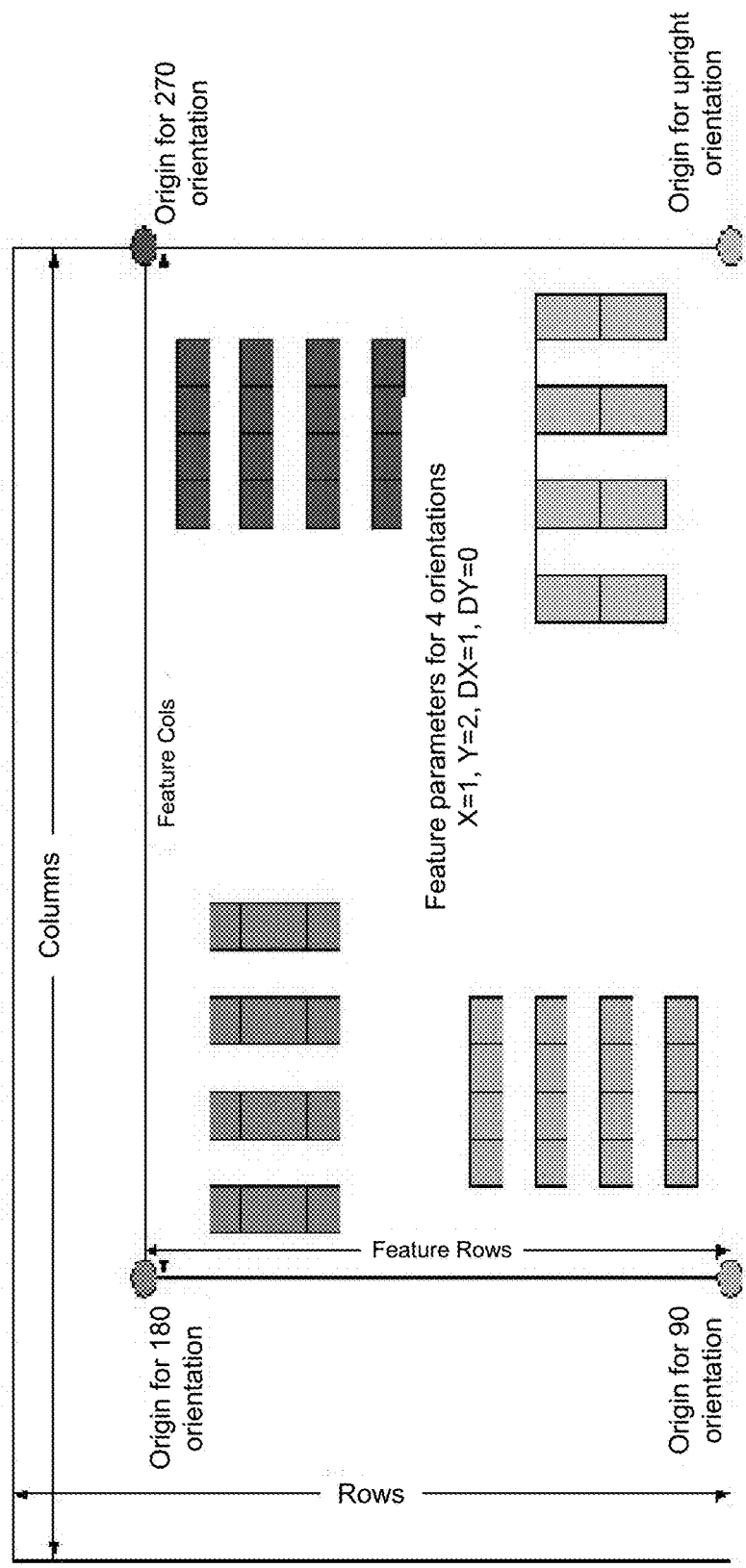
FIG. 6 illustrates an example of orientation-specific feature detection performed by an accelerated computer vision (CV) computation unit (such as the one shown in FIG. 5), in accordance with certain embodiments of the disclosure.

FIG. 6 illustrates an example of orientation-specific feature detection performed by an accelerated computer vision (CV) computation unit 506 (such as the one shown in FIG. 5), in accordance with certain embodiments of the disclosure. Here, accelerated CV computation unit 506 is capable of performing feature detection according to any one of four possible orientations, e.g., 0 degrees, 90 degrees, 180 degrees, and 270 degrees. The orientation may be specified as an input to accelerated computer vision (CV) computation unit 506, such as via control bits provided by orientation detection controller 508 as discussed previously.

Utilizing a component such as accelerated CV computation unit 506 to perform orientation-specific feature detection in this manner has significant advantages. To perform feature detection at, for example, a 90 degree rotation, it is not necessary to first rotate the image portion by 90 degrees prior to feature detection. Image rotation, such as that provided by image rotation buffer 504, may be computationally intensive and involve a large number of read and write cycles. Instead, the unrotated image portion may be fed to accelerated CV computation unit 506, and accelerated CV computation unit 506 may work directly on the unrotated image portion to detect a target feature at a 90 degree rotation offset. Accelerated CV computation unit 506 is capable of doing so by internally performing an efficient coordinate mapping, to appropriately map pixels to different orientations selected from the limited number of available orientations, for example, at 0 degrees, 90 degrees, 180 degrees, and 270 degrees, as shown in FIG. 6. Accelerated CV computation unit 506 thus performs orientation-specific feature detection directly on a portion of image received from image buffer 502 or rotation buffer 504.

FIG. 7 is a table showing a wide range of hypothesized feature angles achieved via various combinations of (1) image rotation and (2) CV unit input orientation, according to various embodiments. In this example, orientation detection controller 508 may achieve a range of hypothesized feature angles, i.e., from 0 to 360 degrees in 15 degree increments, by controlling both the (1) image rotation and (2) CV unit input orientation. The possible image rotations shown in this example are: 0 degrees, 15 degrees, 30 degrees, 45 degrees, 60 degrees, and 75 degrees. The possible CV unit input orientations in this example are: 0 degrees, 90 degrees, 180 degrees, and 270 degrees. Here, "the CV unit input orientation" refers to the orientation of the detector, i.e., the orientation in which the detector operates to detect the target feature. The "CV unit input orientation" in this example does not refer to a change in the orientation of the image portion provided as input to the CV unit. The combination of both image rotation and CV unit input orientation allows orientation detection controller 508 to cycle through all angles from 0 to 360 degrees in 15 degree increments. At each such angle, feature detection may be performed using accelerated CV computation unit 506 to see if the target feature is detected. Upon receipt of an indication that the target feature is detected, such as via the object detection flag shown in FIG. 5, orientation detection controller 508 may declare that the current feature angle, e.g., 135 degrees, is the detected orientation of the object in the image.

Figure 8:
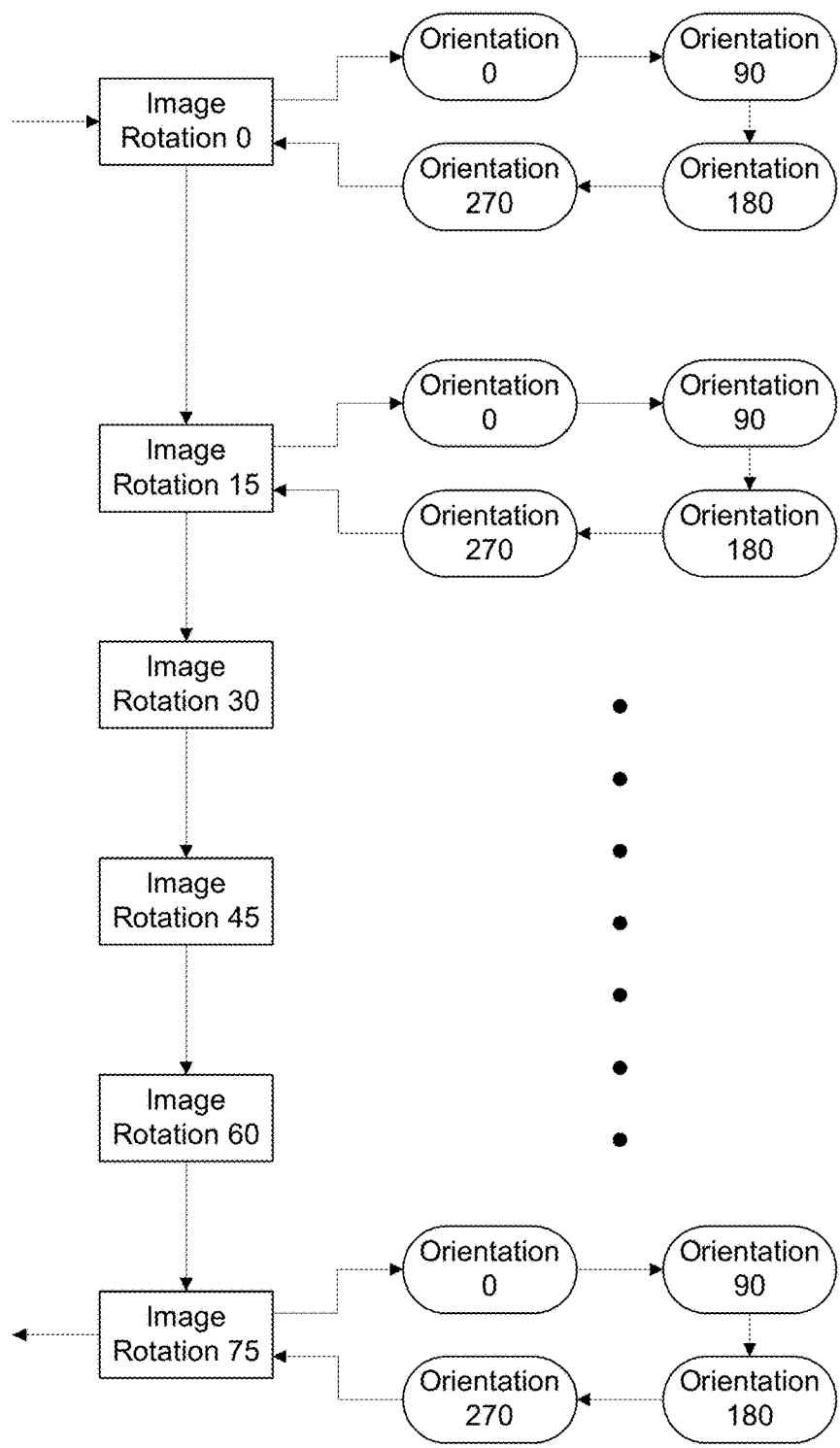
FIG. 8 shows different states of an orientation detection controller, with each state representing a different combination of (1) image rotation and (2) CV unit input orientation, according to various embodiments.

FIG. 8 shows different states of orientation detection controller 508, with each state representing a different combination of (1) image rotation and (2) CV unit input orientation, according to various embodiments. For example, orientation detection controller 508 may systematically cycle through the states depicted in FIG. 8, until the orientation of the object within the image is detected. As shown, the process may start in a state that corresponds to image rotation at 0 degrees. While keeping the image rotation at 0 degrees, the CV unit input orientation may be cycled through different values, such as 0 degrees, 90 degrees, 180 degrees, and 270 degrees. Next, the process may move to a state that corresponds to image rotation at 15 degrees. While keeping the image rotation at 15 degrees, the CV unit input orientation may be cycled through different values, such as 0 degrees, 90 degrees, 180 degrees, and 270 degrees. A similar pattern of cycling through available CV unit input orientations may be applied through different image rotations such as 30 degrees, 45 degrees, 60 degrees, and finally 70 degrees, until the target feature is recognized, at which point the orientation of the object (e.g., human face) is determined.

Note that the particular order in which the various states are visited may be altered. FIG. 8 shows just one example, in which the process holds the image rotation at each angle while cycling through different CV unit input orientations (e.g., 0 degrees, 90 degrees, 180 degrees, and 270 degrees). Alternatively, the process may hold the CV unit input orientation at each value while cycling through different image rotations (e.g., 0 degrees, 15 degrees, 30 degrees, 45 degrees, 60 degrees, and 75 degrees).

Detection Mode v. Tracking Mode

According to various embodiments, the orientation of the at least one object within an image is determined based on multiple modes, the multiple modes comprising (a) a detection mode for detecting an initial orientation of the at least one object within an initial image and (b) a tracking mode for tracking the orientation of the at least one object within a subsequent image, using the detected initial orientation. Here, detection and tracking may involve related but somewhat different operations. In particular, detection of the orientation of an object in an image, as discussed in the above sections, is generally done without any prior knowledge of the possible orientation of the object. That is, the orientation of the object is equally likely to be at one angle as any other angle. Thus, detection of the object's orientation within the image may be performed by systematically cycling through all possible angles (or angle increments) until the target feature (e.g., human face) is detected.

By contrast, tracking of the orientation of an object in an image is generally performed with some knowledge of the possible orientation of the object. In particular, because tracking generally follows detection, a "last known orientation" may be available and taken into account in performing orientation tracking. Just as an example, consider a sequence of images comprising image 0, image 1, image 2, image 3, etc. captured by image sensor 402. By processing image 0, object orientation detection may be performed. For example, an orientation of a face of a user may be determined by using image 0 and utilizing operating image buffer 502, rotation buffer 504, accelerated CV computation unit 506, and orientation detection controller 508 in a manner such as that discussed in the above sections.

Once the orientation of the face of the user in image 0 is detected, the orientation of the face in image 1 may simply be tracked, without performing a full set of operations associated with orientation detection. For example, the tracking technique may take advantage of prior knowledge of the "last known orientation" of the user's face determined using image 0. Various techniques for tracing may be employed. One exemplary tracking technique involves starting at the "last known orientation" and using it as a seed angle, then performing feature detection at hypothesized angles that progressively extend in positive and negative relative offsets from the seed angle. For instance, if the orientation of the user's face was determined to be at angle of 90 degrees based on orientation detection performed on image 0, tracking can be employed to attempt to detect a human face first at +15 degrees offset from 90 degrees (i.e., 105 degrees), followed by attempted detection at −15 degrees offset from 90 degrees (i.e., 75 degrees), followed by attempted detection at +30 degrees offset from 90 degrees (i.e., 120 degrees), followed by attempted detection at −30 degrees offset from 90 degrees (i.e., 60 degrees), and so on, until a human face is detected in image 1. Such use of a seed angle provides a shortcut to avoid systematically cycling through all possible feature angles, such as that associated with full orientation detection. Thus, tracking that takes advantage of existing knowledge of the "last known orientation" can be significantly more efficient, when compared to orientation detection performed without any knowledge of the possible orientation of the object within the image.

Figure 9:
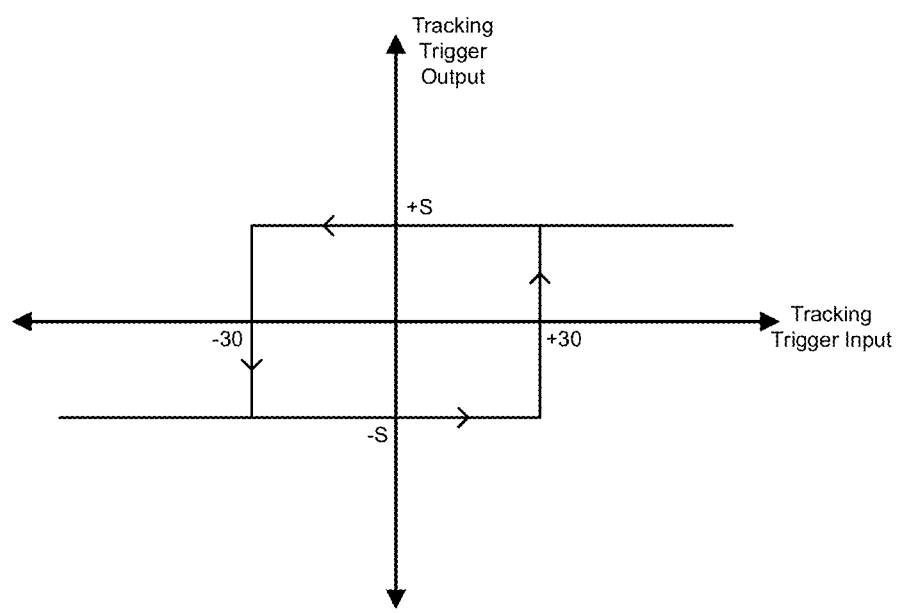
FIG. 9 illustrates a hysteresis function built into the trigger operation of an orientation tracking technique, in accordance with embodiments of the disclosure.

FIG. 9 illustrates a hysteresis function built into the trigger operation of an orientation tracking technique, in accordance with embodiments of the disclosure. In one embodiment, tracking may be triggered upon any deviation from the current angle. For example, in a particular image, if the user's face is not detected at the "last known orientation" from the previous image, the tracking mode may immediately be triggered and begin to search through hypothesized angles in an attempt to detect the user's face. However, in certain scenarios, the failure to immediately detect the orientation of the user's face at the "last known orientation" might have occurred in error, e.g., as result of noise, etc. Thus, according to certain embodiments, a hysteresis function is adopted to prevent a first false positive from causing an unnecessary search through hypothesized angles.

According to further embodiments, non-image sensors may also be used to aid in the tracking of the orientation of an object in a sequence of images. One example of such a non-image sensor is an accelerometer on board the mobile device. The accelerometer reading may indicate an angular rotation of the mobile device. Readings from the accelerometer may be used in a variety of ways. One use of the accelerometer reading is to provide an additional or alternative source of information for triggering the tracking mode of the system. Another use of the accelerometer reading is to provide a seed angle for the tracking mode once it has been triggered.

Referring back to FIG. 9, the figure shows an accelerometer reading being used to (1) trigger tracking according to a hysteresis function and (2) provide a seed angle for performing tracking. Here, if the accelerometer reading indicates that the mobile device has rotated by 30 degrees or more, then the tracking mode is triggered. Upon entering the tracking mode, the reading from the accelerometer (shown as +S or −S) may be used as a seed angle from which to start tracking operations.

Furthermore, other information may be used to aid in the tracking of the orientation of an object in a sequence of images, according to certain embodiments of the disclosure. For example, statistics can be taken relating to each image, the object, and/or the areas near the object, to estimate the possible orientation of the object. Non-image sensor readings can also be used in a similar manner, as discussed previously. Such alternatively or additionally obtained estimates of the orientation of the object may be used to trigger, seed, or otherwise aid in the tracking of the orientation of the object within one or more images. Statistics such as those discussed above can be generated from an image detector such as object orientation detector 404, a different image detector, or a non-image sensor.

Figure 10:
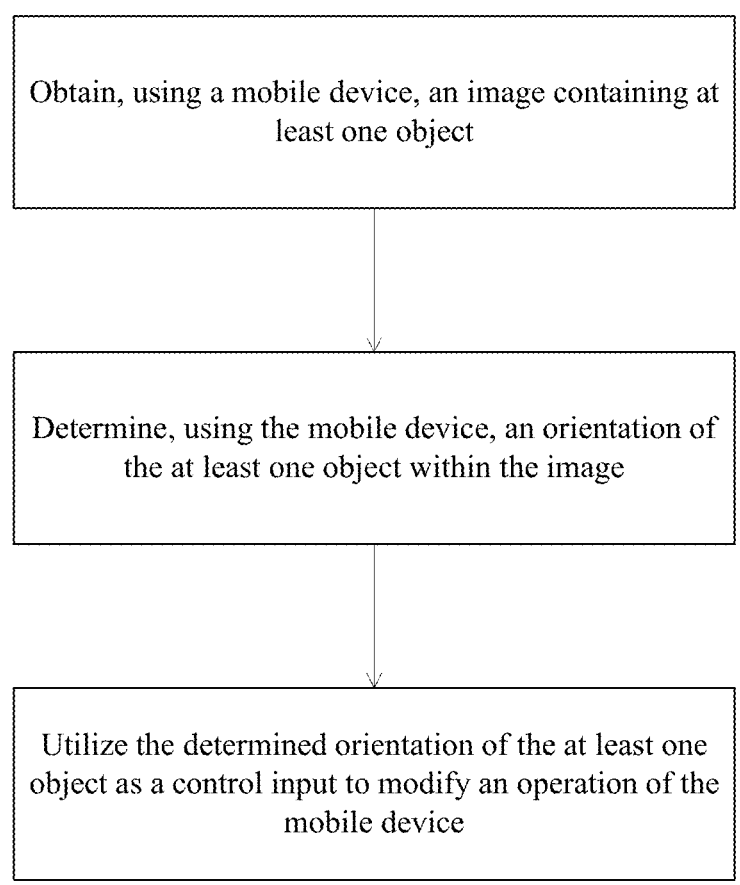
FIG. 10 is a flow chart showing illustrative steps in a process for performing image processing and utilization according to at least one embodiment of the disclosure.

FIG. 10 is a flow chart showing illustrative steps in a process 1000 for performing image processing and utilization according to at least one embodiment of the disclosure.

Figure 11:
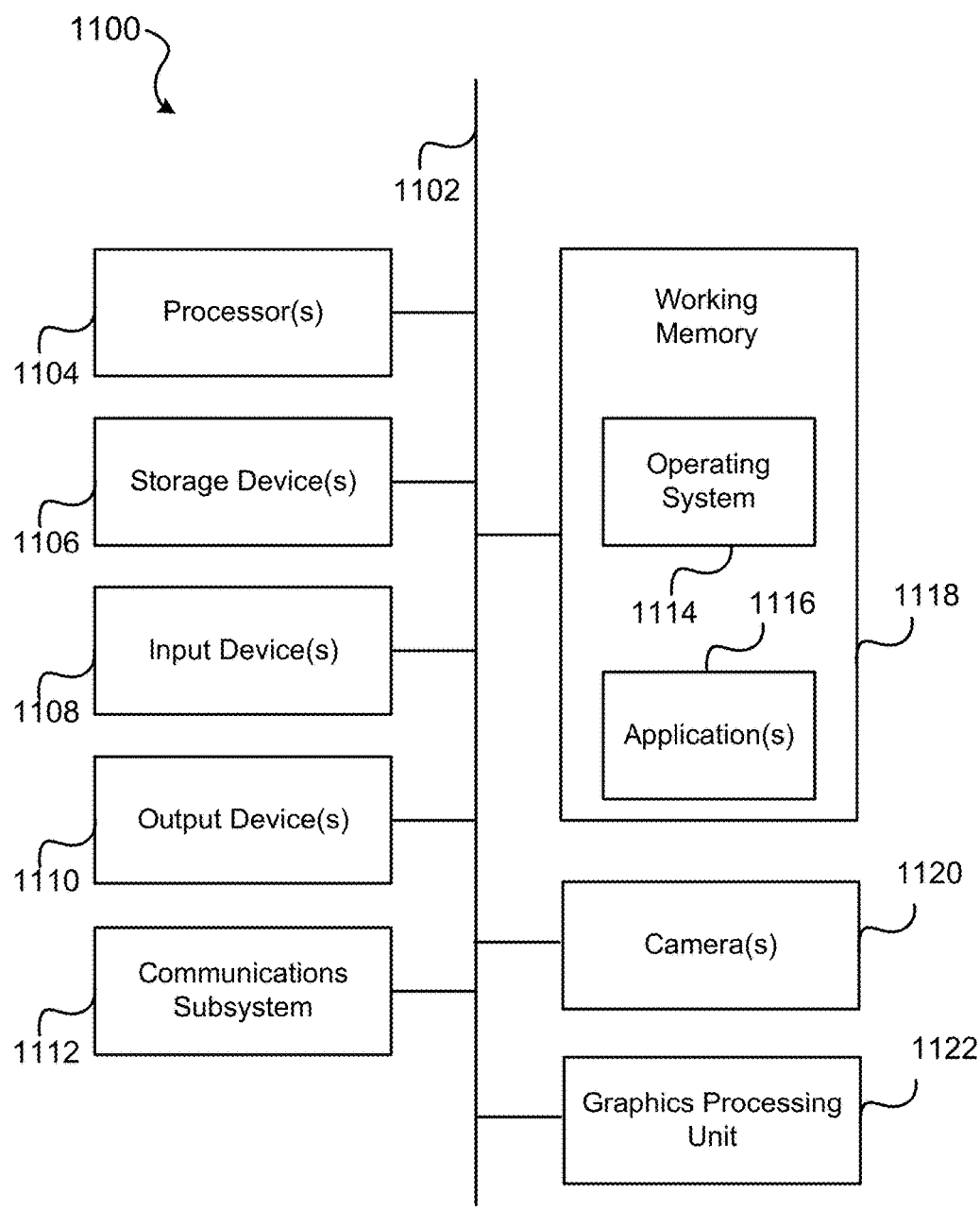
FIG. 11 illustrates an example computer system 1100 that can be used to implement features of the disclosure.

FIG. 11 illustrates an example computer system 1100 that can be used to implement features of the disclosure. Computer system 1100 is shown comprising hardware elements that can be electrically coupled via a bus 1102 (or may otherwise be in communication, as appropriate). The hardware elements may include one or more processors 1104, including without limitation one or more general-purpose processors and/or one or more special-purpose processors (such as digital signal processing chips, graphics processing units 1122, and/or the like); one or more input devices 1108, which can include without limitation one or more cameras, sensors, a mouse, a keyboard, a microphone configured to detect ultrasound or other sounds, and/or the like; and one or more output devices 1110, which can include without limitation a display unit such as the device used in implementations of the invention, a printer and/or the like. Additional cameras 1120 may be employed for detection of user's extremities and gestures. In some implementations, input devices 1108 may include one or more sensors such as infrared, depth, and/or ultrasound sensors. The graphics processing unit 1122 may be used to carry out the method for real-time wiping and replacement of objects described above.

In some implementations of the implementations of the invention, various input devices 1108 and output devices 1110 may be embedded into interfaces such as display devices, tables, floors, walls, and window screens. Furthermore, input devices 1108 and output devices 1110 coupled to the processors may form multi-dimensional tracking systems.

The computer system 1100 may further include (and/or be in communication with) one or more non-transitory storage devices 1106, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1100 might also include a communications subsystem 1112, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 1112 may permit data to be exchanged with a network, other computer systems, and/or any other devices described herein. In many implementations, the computer system 1100 will further comprise a non-transitory working memory 1118, which can include a RAM or ROM device, as described above.

The computer system 1100 also can comprise software elements, shown as being currently located within the working memory 1118, including an operating system 1114, device drivers, executable libraries, and/or other code, such as one or more application programs 1116, which may comprise computer programs provided by various implementations, and/or may be designed to implement methods, and/or configure systems, provided by other implementations, as described herein. Merely by way of example, one or more procedures described with respect to the method(s)

discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1106 described above. In some cases, the storage medium might be incorporated within a computer system, such as computer system 1100. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by the computer system 1100 and/or might take the form of source and/or installable code, which, upon compilation and/or installation on the computer system 1100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computer system 1100 may be omitted or may be implemented separate from the illustrated system. For example, the processor 1104 and/or other elements may be implemented separate from the input device 1108. In one implementation, the processor may be configured to receive images from one or more cameras that are separately implemented. In some implementations, elements in addition to those illustrated in FIG. 4 may be included in the computer system 1100.

Some implementations may employ a computer system (such as the computer system 1100) to perform methods in accordance with the disclosure. For example, some or all of the procedures of the described methods may be performed by the computer system 1100 in response to processor 1104 executing one or more sequences of one or more instructions (which might be incorporated into the operating system 1114 and/or other code, such as an application program 1116) contained in the working memory 1118. Such instructions may be read into the working memory 1118 from another computer-readable medium, such as one or more of the storage device(s) 1106. Merely by way of example, execution of the sequences of instructions contained in the working memory 1118 might cause the processor(s) 1104 to perform one or more procedures of the methods described herein.

The terms "machine-readable medium" and "computer-readable medium," as used herein, refer to any medium that participates in providing data that causes a machine to operate in a specific fashion. In some implementations implemented using the computer system 1100, various computer-readable media might be involved in providing instructions/code to processor(s) 1104 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 1106. Volatile media include, without limitation, dynamic memory, such as the working memory 1118. Transmission media include, without limitation, coaxial cables, copper wire, and fiber optics, including the wires that comprise the bus 1102, as well as the various components of the communications subsystem 1112 (and/or the media by which the communications subsystem 1112 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100. These signals, which might be in the form of electromagnetic signals, acoustic signals, optical signals and/or the like, are all examples of carrier waves on which instructions can be encoded, in accordance with various implementations of the invention.

The communications subsystem 1112 (and/or components thereof) generally will receive the signals, and the bus 1102 then might carry the signals (and/or the data, instructions, etc. carried by the signals) to the working memory 1118, from which the processor(s) 1104 retrieves and executes the instructions. The instructions received by the working memory 1118 may optionally be stored on a non-transitory storage device either before or after execution by the processor(s) 1104.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method for image processing and utilization, comprising:
    obtaining, using a mobile device, an image containing a face of a user of the mobile device;
    determining, using the mobile device, an orientation of the face of the user within the image, wherein the orientation of the face of the user within the image is determined using multiple stages, the multiple stages comprising:
        (a) a rotation stage for controlling a rotation along a rotation axis applied to a portion of the image, to generate a portion of rotated image; and
        (b) an orientation stage for operating a feature detector at a plurality of orientation offsets along the rotation axis, including a first orientation offset and a second orientation offset, using the portion of rotated image,
    wherein for the first orientation offset, the first orientation offset is provided as an input to the detector to instruct the detector to perform feature detection at the first orientation offset on the portion of rotated image;
    wherein for the second orientation offset, the second orientation offset is provided as an input to the detector to instruct the detector to perform feature detection at the second orientation offset on the portion of rotated image; and
    utilizing the determined orientation of the face of the user as a control input to modify a display rotation of the mobile device.

2. The method of claim 1, wherein the portion of rotated image is stored in a rotation buffer.

3. The method of claim 1, wherein the orientation-specific feature detection is performed using a computer vision (CV) computation unit.

4. The method of claim 1, wherein the orientation of the face of the user within the image is determined based on multiple modes, the multiple modes comprising:
    (a) a detection mode for detecting an initial orientation of the face of the user within an initial image; and
    (b) a tracking mode for tracking the orientation of the face of the user within a subsequent image, using the detected initial orientation.

5. The method of claim 4,
    wherein in the detection mode, the initial orientation of the face of the user within the image is detected by performing feature detection at a first plurality of hypothesized angles; and
    wherein in the tracking mode, the orientation of the face of the user within the subsequent image is tracked by performing feature detection at a second plurality of hypothesized angles, the second plurality being fewer than the first plurality.

6. The method of claim 4,
    wherein in the tracking mode, the orientation of the face of the user within the subsequent image is tracked upon detection of a trigger condition associated with a non-image sensor.

7. The method of claim 6, wherein the non-image sensor comprises an accelerometer.

8. An apparatus for image processing and utilization, comprising:
- an image sensor configured to obtain an image containing at least a face of a user of a mobile device;
- a rotation buffer configured to store a portion of rotated image resulting from applying a rotation along a rotation axis to a portion of the image;
- a computer vision (CV) computation unit configured to determine an orientation of the face of the user within the image, wherein the CV computation unit is configured to
  - perform feature detection at a plurality of orientation offsets along the rotation axis, including a first orientation offset and a second orientation offset, using the portion of rotated image,
- wherein for the first orientation offset, the first orientation offset is provided as an input to the CV computation unit to instruct the CV computation unit to perform feature detection at the first orientation offset on the portion of rotated image;
- wherein for the second orientation offset, the second orientation offset is provided as an input to the CV computation unit to instruct the CV computation unit to perform feature detection at the second orientation offset on the portion of rotated image; and
- a controller configured to receive and organize the determined orientation of the face of the user as a control input to modify a display rotation of the mobile device.

9. The apparatus of claim 8, wherein the CV computation unit is configured to determine the orientation of the face of the user on multiple modes, the multiple modes comprising:
- (a) a detection mode for detecting an initial orientation of the face of the user within an initial image; and
- (b) a tracking mode for tracking the orientation of the face of the user within a subsequent image, using the detected initial orientation.

10. The apparatus of claim 9,
- wherein in the detection mode, the CV computation unit is configured to detect the initial orientation of the face of the user within the image by performing feature detection at a first plurality of hypothesized angles; and
- wherein in the tracking mode, the CV computation unit is configured to track the orientation of the face of the user within the subsequent image by performing feature detection at a second plurality of hypothesized angles, the second plurality being fewer than the first plurality.

11. The apparatus of claim 9,
- wherein in the tracking mode, the CV computation unit is configured to track the orientation of the face of the user within the subsequent image based upon detection of a trigger condition associated with a non-image sensor.

12. The apparatus of claim 11, wherein the non-image sensor comprises an accelerometer.

13. A non-transitory computer-readable medium having instructions embedded thereon for image processing and utilization, the instructions, when executed by one or more processing units, cause the one or more processing units to perform:
- obtaining, using a mobile device, an image containing a face of a user of the mobile device;
- determining, using the mobile device, an orientation of the face of the user within the image, wherein the orientation of the face of the user within the image is determined using multiple stages, the multiple stages comprising:
  - (a) a rotation stage for controlling a rotation along a rotation axis applied to a portion of the image, to generate a portion of rotated image; and
  - (b) an orientation stage for operating a feature detector at a plurality of orientation offsets along the rotation axis, including a first orientation offset and a second orientation offset, using the portion of rotated image,
  - wherein for the first orientation offset, the first orientation offset is provided as an input to the detector to instruct the detector to perform feature detection at the first orientation offset on the portion of rotated image;
  - wherein for the second orientation offset, the second orientation offset is provided as an input to the detector to instruct the detector to perform feature detection at the second orientation offset on the portion of rotated image; and
- utilizing the determined orientation of the face of the user as a control input to modify a display rotation of the mobile device.

14. The non-transitory computer-readable medium of claim 13, wherein the portion of rotated image is stored in a rotation buffer.

15. The non-transitory computer-readable medium of claim 13, wherein the orientation-specific feature detection is performed using a computer vision (CV) computation unit.

16. The non-transitory computer-readable medium of claim 13, wherein the orientation of the face of the user within the image is determined based on multiple modes, the multiple modes comprising:
- (a) a detection mode for detecting an initial orientation of the face of the user within an initial image; and
- (b) a tracking mode for tracking the orientation of the face of the user within a subsequent image, using the detected initial orientation.

17. The non-transitory computer-readable medium of claim 16,
- wherein in the detection mode, the initial orientation of the face of the user within the image is detected by performing feature detection at a first plurality of hypothesized angles; and
- wherein in the tracking mode, the orientation of the face of the user within the subsequent image is tracked by performing feature detection at a second plurality of hypothesized angles, the second plurality being fewer than the first plurality.

18. The non-transitory computer-readable medium of claim 16,
- wherein in the tracking mode, the orientation of the face of the user within the subsequent image is tracked upon detection of a trigger condition associated with a non-image sensor.

19. The non-transitory computer-readable medium of claim 18, wherein the non-image sensor comprises an accelerometer.

20. A system for image processing and utilization, comprising:
- means for obtaining, using a mobile device, an image containing a face of a user of the mobile device;
- means for determining, using the mobile device, an orientation of the face of the user within the image, wherein the orientation of the face of the user within the image is determined using multiple stages, the multiple stages comprising:
  - (a) a rotation stage for controlling a rotation along a rotation axis applied to a portion of the image, to generate a portion of rotated image; and (b) an orientation stage for operating a feature detector at a plurality of orientation offsets along the rotation axis, including a first orientation offset and a second orientation offset, using the portion of rotated image, wherein for the first orientation offset, the first orientation offset is provided as an input to the detector to instruct the detector to perform feature detection at the first orientation offset on the portion of rotated image;

wherein for the second orientation offset, the second orientation offset is provided as an input to the detector to instruct the detector to perform feature detection at the second orientation offset on the portion of rotated image; and means for utilizing the determined orientation of the face of the user as a control input to modify a display rotation of the mobile device.

21. The system of claim 20, wherein the portion of rotated image is stored in a rotation buffer.

22. The system of claim 20, wherein the orientation-specific feature detection is performed using a computer vision (CV) computation unit.

23. The system of claim 20, wherein the orientation of the face of the user within the image is determined based on multiple modes, the multiple modes comprising:

(a) a detection mode for detecting an initial orientation of the face of the user within an initial image; and (b) a tracking mode for tracking the orientation of the face of the user within a subsequent image, using the detected initial orientation.

24. The system of claim 23, wherein in the detection mode, the initial orientation of the face of the user within the image is detected by performing feature detection at a first plurality of hypothesized angles; and wherein in the tracking mode, the orientation of the face of the user within the subsequent image is tracked by performing feature detection at a second plurality of hypothesized angles, the second plurality being fewer than the first plurality.

25. The system of claim 23, wherein in the tracking mode, the orientation of the face of the user within the subsequent image is tracked upon detection of a trigger condition associated with a non-image sensor.

26. The system of claim 25, wherein the non-image sensor comprises an accelerometer.

* * * * *